JOHN C. HOHAM
INVENTOR.

KENDRICK, SUBKOW and STOLZY
BY
ATTORNEYS

3,394,054
SOLAR DISTILLATION WITH HEAT TRANSFER FLUID
John C. Hoham, 9120 Mission Blvd., Riverside, Calif. 92509
Filed July 21, 1965, Ser. No. 473,685
3 Claims. (Cl. 202—177)

ABSTRACT OF THE DISCLOSURE

A heat transmitting fluid is passed along a conduit located along the focal line of a parabolic cylinder exposed to the sunlight. The solar heated fluid passes into heat transferring relationship with other conduits containing the fluid to be distilled. A pair of valving means and intervening piping means are disposed between the solar heater and the evaporator, selective actuation of which provides for recirculation of the heating fluid either remotely from the evaporator to store heat energy, or through the evaporator and excluding the solar heater. Scale removing means associated with the evaporator are provided.

---

This invention relates to the distillation art, and more particularly to a method and system for distilling liquids.

Although the present invention may have other applications, it has been found to possess exceptional utility in the distillation of water. The invention, however, is not limited to such an application.

In the prior art, solar stills have suffered several serious disadvantages. A sun ray reflector in the shape of a parabolic cup of revolution has been employed. This reflector has concentrated the sun's rays at a single point focus and has thus limited the amount of water which can be heated.

Other prior art devices have also been operative only in the day time. They have also been inefficient because the heat of the distillate has not been used.

Finally, prior art devices develop scale which acts as an insulator in a distillation retort.

The above-described and other disadvantages of the prior art are overcome by providing a reflector having the shape of what is known mathematically as a parabolic cylinder, and a length of pipe to carry fluid located at the focus of the parabola. In accordance with this feature of the invention, sun rays are focused along the length of the pipe and the fluid is heated as it progresses flowing in the pipe. The concentration of the sun's rays is therefore not at a single point. In accordance with another feature of the present invention, the heat of the distillate is used to heat water that is pumped into the system. According to another feature of the invention, a device is employed to remove the scale from the retort in which water is vaporized.

It is also a feature of the present invention that the fluid pumped through the pipe is also pumped through a heat storage area.

Still another feature of the invention resides in the circulation of a high temperature fluid through the focal pipes 16, 17 and around the water containing pipe in the retort.

The above-described and other advantages of the present invention will be better understood from the following description when considered in connection with the accompanying drawings.

In the drawings, which are to be regarded as merely illustrative:

Figure 1:
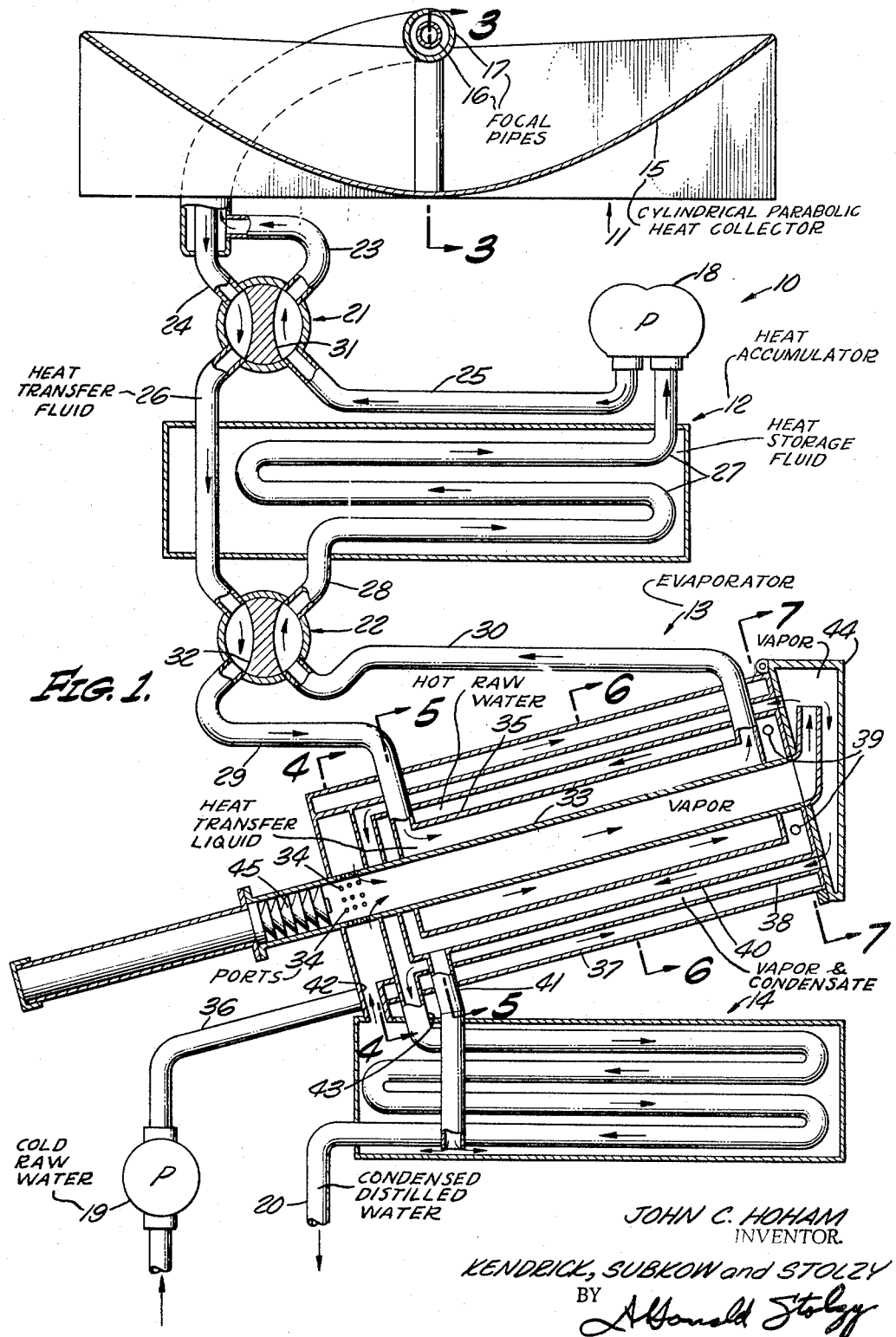
FIG. 1 is a side elevational view, partly in section, of apparatus constructed in accordance with the present invention.

In the drawing in FIG. 1, the distillation apparatus of the present invention is indicated at 10.

This apparatus includes a heat collection unit 11, a heat storage unit 12, an evaporator 13, and a condenser 14.

Heat collection unit 11 includes a reflector in the shape of a parabolic cylinder 15 which has inner and outer pipes 16 and 17 located along its length at the focus of the parabola.

Three separate fluid systems are used in the apparatus 10. A fluid is moved by a pump 18 which may be a melted alkali metal, sulphur or mercury.

Energy storage unit contains sulphur or potassium or mercury. Raw water is pumped through the system by a pump at 19 which is subsequently distilled. Distilled water flows out of a pipe 20 from condenser 14. A valve 21 connects collection unit 11 to storage unit 12. A second valve 22 connects storage unit 12 to evaporator 13.

Figure 3:
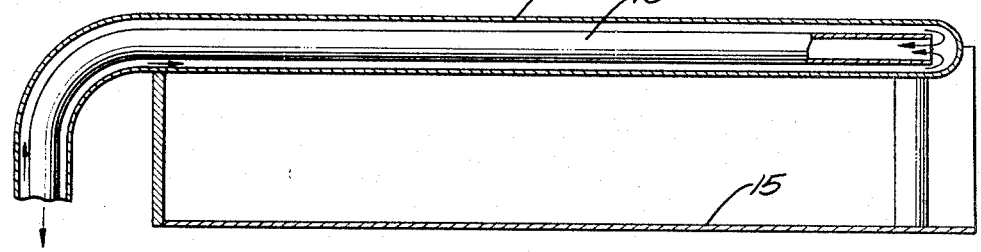
FIG. 3 is a sectional view of an energy collection unit taken on the line 3—3 shown in FIG. 1.
Figure 4:
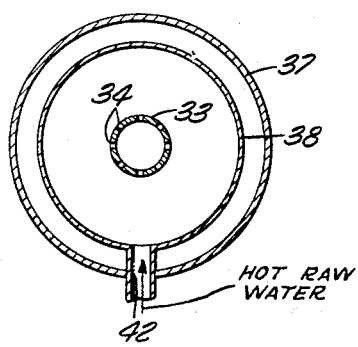
FIG. 4 is a transverse sectional view of an evaporator taken on the line 4—4 shown in FIG. 1.
Figure 5:
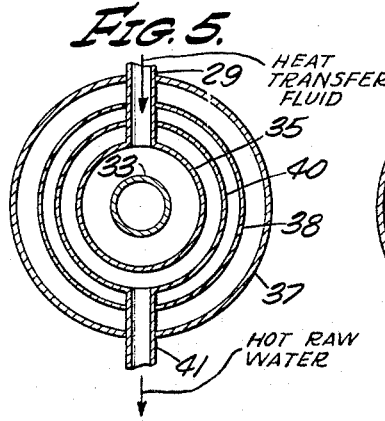
FIG. 5 is a transverse sectional view of the evaporator taken on the line 5—5 shown in FIG. 1.
Figure 6:
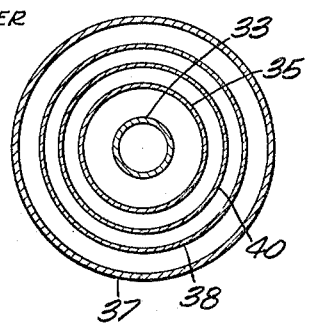
FIG. 6 is a transverse sectional view of the evaporator taken on the line 6—6 shown in FIG. 1.
Figure 7:
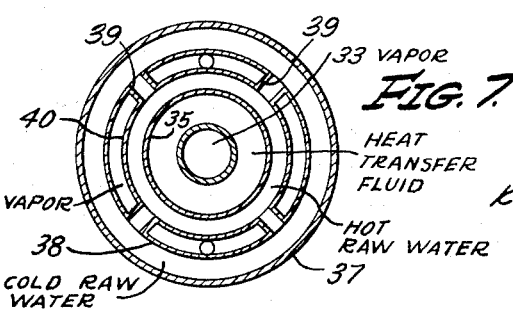
FIG. 7 is a transverse sectional view of the evaporator taken on the line 7—7 shown in FIG. 1.

As shown in FIG. 3, pump 18 pumps heat exchanger fluid in the space between outer tube 17 and inner tube 16.

Outer tube 17 and inner tube 16 are connected at 23 and 24 to valve 21. A connection is made from valve 21 to pump 18 at 25. A connection through storage unit 12 is made from valve 21 to valve 22 at 26. Pump 18 is connected to storage unit 12 by a series of coils 27.

A connection is made between valve 22 and coils 27 at 28. Valve 22 is connected to evaporator 13 at 29 and 30.

As shown in FIG. 1, valves 21 and 22 are set for day time operation. In this operation, fluid in storage unit 12 is warmed as water is distilled. Valves 21 and 22 have gates 31 and 32 therein to change the flow of fluid. When valve 22 is left in the position shown, and valve 21 is turned 90° to the right or to the left, the apparatus is run at night using the heat stored in unit 12.

Heat storage unit 12 may be charged by leaving valve 21 in the position shown and turning the gate of valve 22 ninety degrees to the right or to the left.

Evaporator 13 has a retort 33 in which all water is evaporated. Retort 33 receives this water through holes 34 at one end of the retort. The fluid in tubes 29 and 30 is circulated around retort 33 inside a cylinder 35.

The flow of water and steam in evaporator 13 from pump 19 will now be described. Note will be taken that evaporator 13 receives water through a tube 36. Tube 36 is connected to the evaporator 13 in a manner to direct raw water between cylinders 37 and 38. The water at the right end of evaporator 13 then passes through openings 39 and flows between cylinder 35 and cylinder 40. This water then flows through condenser 14 via a connection at 41. The water then flows back into evaporator 13 through an opening 42 and through holes 34, as described previously. Steam emanating from retort 33 is then directed between tubes 38 and 40 and back through condenser 14 by a connection 43. Condensed water is then dispensed through tube 20.

Figure 2:
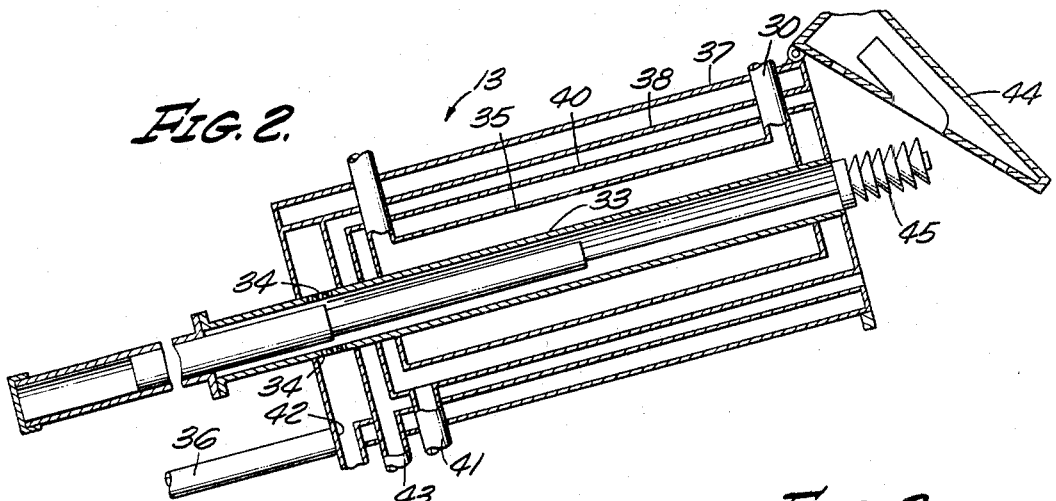
FIG. 2 is an operational view of a portion of the apparatus shown in FIG. 1.

In accordance with the present invention, evaporator 13 has a door 44 which is retractable to a position shown in FIG. 2. In this position, retort 33 is cleaned by a device indicated at 45 in FIG. 2.

From the foregoing, it will be appreciated that the fluid flowing between inner tube 16 and outer tube 17 will be heated continuously along their lengths due to the use of the reflector 15 in the shape of a parabolic cylinder. Further, heat storage unit 12 enables night time operation.

The use of the materials described herein at high temperatures makes possible rapid and economical distillation. The descaling apparatus 45 also facilitates efficient operation. The same is true of heating raw water in condenser 14 as the distillate is condensed.

Although only one specific embodiment of the invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. In water distillation apparatus including a solar heater, an evaporator and a condenser, the improvement comprising:
 indirect heat transferring means relating the solar heater and evaporator including conduit means arranged in a closed path between the solar heater and evapoartor through which is passed only a heat retaining fluid for transferring heat from the solar heater to the evaporator to evaporate the water to be distilled, said apparatus being provided, intermediate the solar heater and evaporator, with first valve means selectively actuable to a first valving condition circulating the heat retaining fluid through the closed path from the solar heater to the evaporator via a heat accumulator and to a second valving condition recirculating said fluid solely within the solar heater.

2. In water distillation apparatus as in claim 1, in which further valving means are operatively connected between the first valving means and the solar heater and actuatable to a first valving condition circulating said fluid through the solar heater and accumulator and to a second valving condition circulating said fluid through an alternate path excluding the solar heater.

3. In water distillation apparatus including a solar heater, an evaporator and a condenser, the improvement comprising indirect heat transferring means relating the solar heater and evaporator including conduit means arranged in a closed path between the solar heater and evaporator through which is passed only a heat retaining fluid for transferring heat from the solar heater to the evaporator to evaporate the water to be distilled, said conduit means including in the solar heater, first and second concentric pipes coaxial with the focus of a parabolic cylinder, one of said pipes being arranged in surrounding relationship to the other, whereby heating fluid passing through the solar heater passes along first the one pipe and then in reverse direction along the other pipe.

References Cited

UNITED STATES PATENTS

| | | | |
|---|---|---|---|
| 2,141,330 | 12/1938 | Abbot | 202—180 |
| 2,211,767 | 8/1940 | Dietrich | 159—5 |
| 2,490,659 | 12/1948 | Snyder | 202—205 |
| 2,490,659 | 12/1949 | Snyder | 202—205 |
| 3,190,343 | 6/1965 | Hussmann | 159—48 X |

NORMAN YUDKOFF, *Primary Examiner.*

J. SOFER, *Assistant Examiner.*